Aug. 28, 1962     T. W. SAFFORD     3,051,338

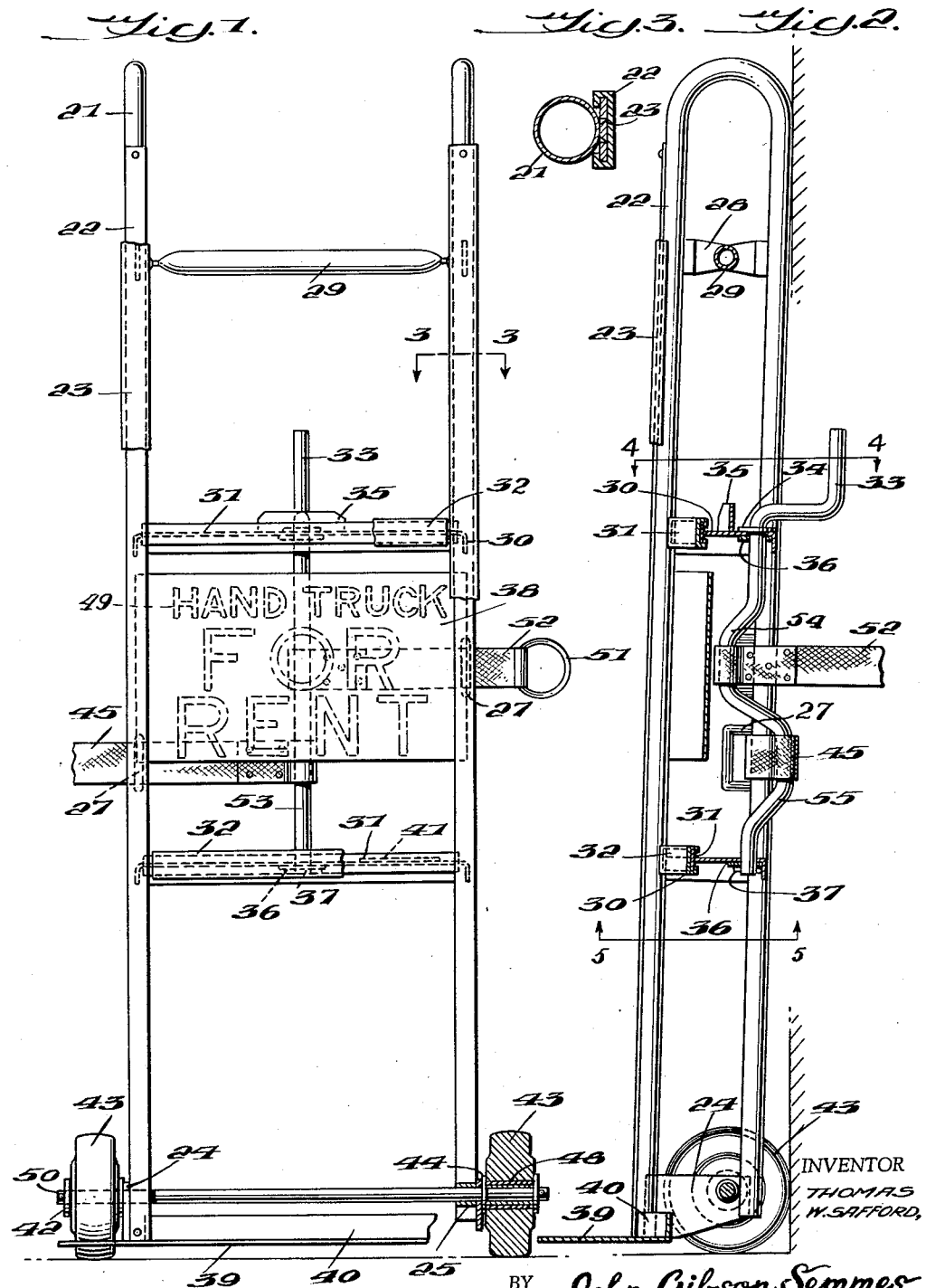

HAND TRUCK ASSEMBLY

Filed June 19, 1961                           2 Sheets-Sheet 2

INVENTOR

THOMAS W. SAFFORD

BY John Gibson Semmes

ATTORNEY

United States Patent Office

3,051,338
Patented Aug. 28, 1962

3,051,338
HAND TRUCK ASSEMBLY
Thomas W. Safford, Santa Clara, Calif., assignor to Arcoa, Inc., Portland, Oreg., a corporation of Oregon
Filed June 19, 1961, Ser. No. 117,909
5 Claims. (Cl. 214—374)

The present invention relates to a hand truck assembly, particularly a fastening means for securing articles to be carried upon hand trucks.

Hand trucks are widely used for the individual and short range hauling of luggage, as well as household furniture items. Strap means have been diversely employed for securing such articles to the truck frame. Several previous inventors have devised rotary crank means for partially tightening such straps about the hand truck frame and the article being carried. However, such rotary crank means have served to tighten the fastening straps from one side of the frame only. As a result, there has been incomplete tensioning of the fastening strap and a tendency of the tensioned portion of the strap to bind and mar the surface of the article being carried.

The present hand truck assembly embodies a frame mounted upon a pair of wheels and a rotary crank having two offset portions, rotatably secured longitudinally of the frame. Separate fastening straps depend transversely from each of the opposed offset portions, are extensible about the article to be carried and are secured to one another by a buckle attached to one of the straps. As a result of employing opposed offset portions in the rotary crank, simultaneous and balanced tensioning of both fastening straps is achieved without binding or marring the surface of the article being carried. Because of the simplicity and effectiveness of the tensioning operation, the present invention is particularly adaptable to the hand truck rental industry wherein handling is by inexperienced individuals.

Accordingly, it is an object of invention to provide in a hand truck assembly means for thoroughly fastening without injuring an article to be carried upon said hand truck.

Another object of invention is to provide in a hand truck assembly tensioning means which are operable to fasten an article to be carried to said truck without binding.

Another object of invention is to provide in a hand truck assembly fastening means a rotary crank having opposed offset portions to which individual fastening straps may be secured.

Yet additional objects of invention will become apparent from the ensuing specification and attached drawings wherein:

FIG. 1 is a top plan view of the hand truck assembly showing rotary crank 53 embodying medially opposed offset portions 54 and 55 and rotatably positioned in transverse spreader plates 30.

FIG. 2 is a longitudinal section of the hand truck assembly.

FIG. 3 is a vertical section taken along section line 3—3 of FIG. 1 and showing the securement of molding 23 to the frame side rails 21 in order to protect the article being carried.

Figure 4:
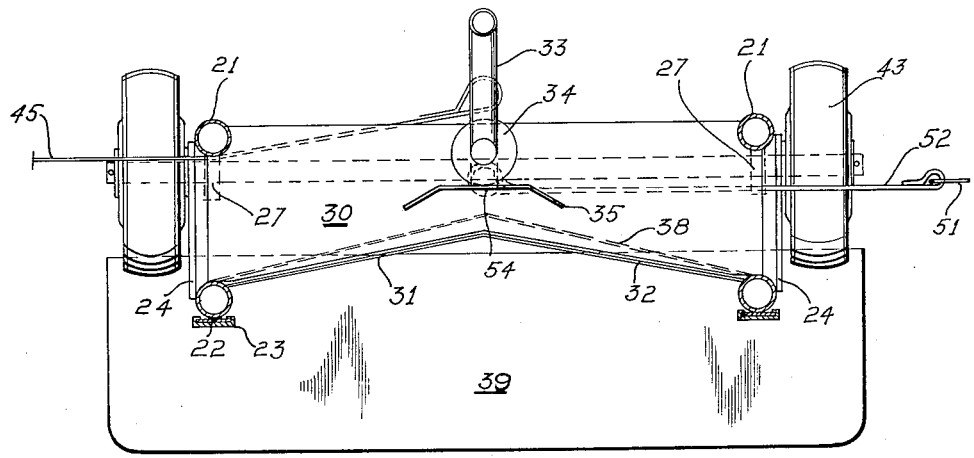
FIG. 4 is a vertical cross-section taken along section line 4—4 of FIG. 2.
Figure 5:
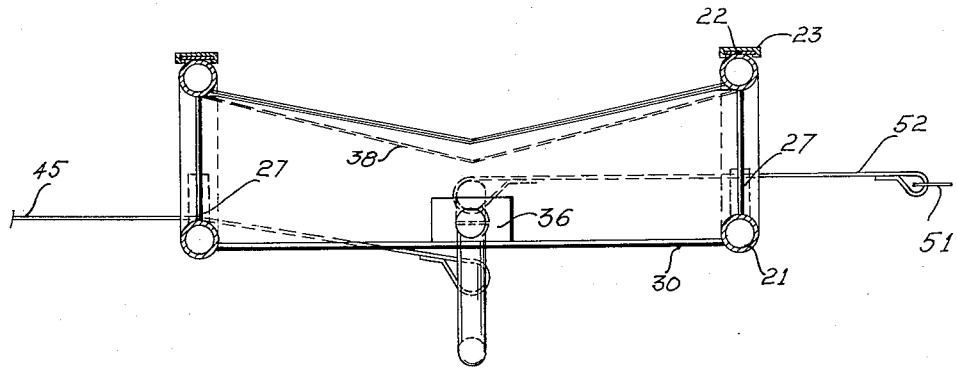
FIG. 5 is a vertical cross-section taken along section line 5—5 of FIG. 2.

In FIG. 2 the hand truck assembly frame is shown as being comprised of side rails 21 secured to each other by transverse spreader plates 30 and spreader bar 29, which is retained at each end by cross bar side rails 28. At the foot of the frame assembly axle 42 is maintained at each end in mounting bushing 25 which in turn is secured by mounting plate 24. Wheel bushing 48 may be applied at the opposed extremities of axle 42 and wheels 43 may be secured on axle 42 by means of washers 44 and cotter pin 50.

As illustrated in FIG. 3, moulding retainers 22 may be secured to the top of the individual side rails 21 and in turn extruded rubber or like moulding 23 may be secured to the retainer 22 in order to protect the article being carried. Similarly, spreader plates 30 may embody on their top surfaces moulding retainer 31 to which moulding 32 may be attached. Decal mounting plate 38 may be attached transversely of side rails 21 intermediate spreader plates 30 and may have an advertising decal 49 illustrated in phantom attached thereto. Also, a serial number plate not illustrated may be attached to any one of the spreader plates 30. At the foot of the frame assembly tow plate 39 embodying drop flange 40 may be secured to the end of side rails 21 by means of mounting plate 24. Axle 42 at each end traverses and is supported in mounting plate 24.

Rotary crank 53 embodying opposed, medial offset portions 54 and 55 is secured intermediate spreader plates 30 by means of reinforcing tabs 36 secured about apertures made in each of the spreader plates. The base of the rotary crank may be secured by a cotter pin or like means 37 and the upper portion of the crank terminating in handle 33 may be further secured by flat washer 34 or the like. A belt tightener handle stop 35 is employed to limit rotation of handle 33 and thus limit the degree of tightening of strap tongue 52, attached to offset portion 54, and strap 45 embodying buckle fastening means 51, attached to offset portion 55. As will be apparent, strap tongue 52 shown fragmentarily extends transversely about the bottom of the frame assembly around the article to be carried and into fastening engagement with buckle 51. Once the strap has been manually tensioned in this manner, crank handle 33 may be rotated to achieve a balanced tensioning of the strap about the article being carried upon the hand truck assembly. Longitudinal slipping of straps 52 and 45 may be prevented by retainer loops 27 attached to the side rail bottoms.

The present construction was devised to enable balanced and efficient tensioning of articles being carried upon a hand truck and facile handling by such inexperienced persons as customarily use rented hand truck assemblies. The employment of opposed offset portions facilitates balanced tensioning, i.e. simultaneous tensioning of each strap from opposite sides of the article being carried upon the hand truck.

As will be apparent, a crank shaft embodying opposed offset portions may be variously configured, the method of attaching the fastening straps to these offset portions may be varied and various modifications of mounting of the rotary crank may be undertaken without departing from the spirit and scope of invention, as defined in the subjoined claims.

I claim:

1. In a hand truck assembly of the type embodying a frame support for articles to be trucked, an article fastening means comprising a crank shaft embodying opposed offset portions and a handle, said shaft being rotatably supported in said frame, a first strap means secured to one of said offset portions and including a fastener at its free end, a second strap means secured at one end to another of said offset portions and having its free end extensible about said frame and into said fastener of said first strap means.

2. An article fastening means as in claim 1, including guide means attached to said frame and engageable with said strap members.

3. An article fastening means as in claim 1, including a handle stop attached to said frame adjacent said crank shaft handle.

4. A hand truck assembly comprising a frame supported upon a pair of wheels, transverse members reinforcing said frame and defining an article fastening bed, a crank shaft having at least two opposed, medial offset portions and a handle at one end, said shaft being rotatably supported in two of said transverse members, a first straps means secured to one of said offset portions and including a fastener at its free end, a second strap means secured at one end to another of said offset portions and having a free end extensible about said frame and an article supported thereon and into said fastener of said first strap means, and a handle stop means attached to one of said transverse members adjacent said crank shaft handle.

5. An article fastening means as in claim 4, including a strap guide means attached to opposed sides of said frame and limiting longitudinal movement of said strap members.

References Cited in the file of this patent

UNITED STATES PATENTS

| | | |
|---|---|---|
| 2,165,603 | Yeats | July 11, 1939 |
| 2,607,606 | Millen | Aug. 19, 1952 |
| 2,772,096 | Hanson | Nov. 27, 1956 |
| 2,778,515 | Hanson | Jan. 22, 1957 |
| 2,838,190 | Stevens | June 10, 1958 |